US007155392B2

(12) United States Patent
Schmid et al.

(10) Patent No.: US 7,155,392 B2
(45) Date of Patent: *Dec. 26, 2006

(54) CONTEXT FREE GRAMMAR ENGINE FOR SPEECH RECOGNITION SYSTEM

(75) Inventors: Philipp Heinz Schmid, Seattle, WA (US); Ralph Lipe, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/052,449

(22) Filed: Feb. 7, 2005

(65) Prior Publication Data

US 2005/0159960 A1 Jul. 21, 2005

Related U.S. Application Data

(63) Continuation of application No. 09/751,613, filed on Dec. 29, 2000, now Pat. No. 6,957,184.

(60) Provisional application No. 60/219,861, filed on Jul. 20, 2000.

(51) Int. Cl.
  *G10L 15/18* (2006.01)

(52) U.S. Cl. ...................... 704/257; 704/251; 704/255; 395/759

(58) Field of Classification Search ............ 704/4, 704/9, 10, 231–232, 275, 257, 251, 255, 704/235, 246; 395/759
See application file for complete search history.

(56) References Cited

U.S. PATENT DOCUMENTS

| 4,771,401 | A |  | 9/1988  | Kaufman et al. ............ 715/533 |
| 4,914,590 | A |  | 4/1990  | Loatman et al. ................ 704/8 |
| 5,621,859 | A |  | 4/1997  | Schwartz et al. ........... 704/256 |
| 5,642,519 | A | * | 6/1997  | Martin ........................... 704/9 |
| 5,748,974 | A |  | 5/1998  | Johnson ......................... 704/9 |
| 5,799,273 | A |  | 8/1998  | Mitchell et al. ............ 704/235 |
| 5,864,863 | A |  | 1/1999  | Burrows .................. 707/103 R |
| 5,865,626 | A |  | 2/1999  | Beattie et al. .............. 434/185 |
| 5,913,192 | A |  | 6/1999  | Parthasarathy et al. ..... 704/256 |
| 5,933,525 | A |  | 8/1999  | Makhoul et al. ............ 382/186 |
| 5,991,720 | A | * | 11/1999 | Galler et al. ............. 704/256.5 |
| 5,995,928 | A |  | 11/1999 | Nguyen et al. ............. 704/251 |
| 6,018,708 | A |  | 1/2000  | Dahan et al. ............... 704/244 |
| 6,021,409 | A |  | 2/2000  | Burrows ..................... 707/102 |
| 6,044,347 | A |  | 3/2000  | Abella et al. ............... 704/272 |
| 6,064,959 | A |  | 5/2000  | Young et al. ............... 704/251 |
| 6,076,056 | A |  | 6/2000  | Huang et al. ............... 704/254 |
| 6,138,098 | A |  | 10/2000 | Shieber et al. ............. 704/257 |
| 6,243,678 | B1 |  | 6/2001  | Erhart et al. ................ 704/249 |
| 6,314,399 | B1 |  | 11/2001 | Deligne et al. ............. 704/257 |

(Continued)

OTHER PUBLICATIONS

Isolated-word sentence recognition using probabilistic context-free grammar By: G.J.F. Jones et al. Eurospeech 91, 2nd European Conf. On Speech Comm. and Tech. Proceedings p. 487-9, vol. 2.

(Continued)

*Primary Examiner*—Richmond Dorvil
*Assistant Examiner*—Huyen X. Vo
(74) *Attorney, Agent, or Firm*—Joseph R. Kelly; Westman, Champlin & Kelly, P.A.

(57) ABSTRACT

The present invention includes a context-free grammar (CFG) engine which communicates through an exposed interface with a speech recognition engine. The context-free grammar engine, in one illustrative embodiment, handles loading and unloading of grammars, as well as maintaining a desired activation state of the grammars which are loaded. Further, the CFG engine represents all loaded grammars, and their corresponding activation states, as a single grammar to the speech recognition engine.

11 Claims, 8 Drawing Sheets

U.S. PATENT DOCUMENTS

| | | | |
|---|---|---|---|
| 6,374,226 B1* | 4/2002 | Hunt et al. | 704/275 |
| 6,377,913 B1 | 4/2002 | Coffman et al. | 704/8 |
| 6,377,925 B1 | 4/2002 | Greene et al. | 704/271 |
| 6,456,974 B1 | 9/2002 | Baker et al. | 704/270.1 |
| 6,466,909 B1 | 10/2002 | Didcock | 704/260 |
| 6,487,533 B1 | 11/2002 | Hyde-Thomson et al. | 704/260 |
| 6,513,009 B1 | 1/2003 | Comerford et al. | 704/270 |
| 6,526,381 B1 | 2/2003 | Wilson | 704/251 |
| 6,535,886 B1 | 3/2003 | Koontz | 707/102 |
| 6,618,703 B1 | 9/2003 | Peres et al. | 704/270 |
| 6,636,831 B1 | 10/2003 | Profit et al. | 704/275 |
| 2002/0138265 A1 | 9/2002 | Stevens et al. | 704/251 |

OTHER PUBLICATIONS

Context-free grammar driven, frame synchronous HMM-based continuous speech recognition methods using word spotting By: S. Nakagawa et al. Transactions of the Inst. of Electr., Information and Communication Engineers D-II vol. J76D-II, No. 7, p. 1329-36.

One-pass continuous speech recognition directed by generalized LR parsing By: K. Kita et al., ICSLP 94. 1994 International Conference on Spoken Language Processing.

The ARISTOTLE speech recognition system By: C. Waters et al., Progress in Connectionist-Based Information Systems.

A context-free grammar compiler for speech understanding systems By: M.K. Brown et al. ICSLP 94. 1994 International Conference on Spoken Language Processing Part. vol. 1, p. 21-4.

Efficient word-graph parsing and search with a stochastic context-free grammar By: C.J. Waters et al., 1997 IEEE Workshop on Automatic Speech Recognition and Understanding Proceedings.

Dynamic programming parsing for context-free grammar in continuous speech recognition By: H. Ney, IEEE Transactions on Signal Processing, vol. 39, No. 2, p. 336-40.

Using a stochastic context-free grammar as a language model for speech recognition By: D. Jurafsky, et al., 1995 International Conference on Acoustics, Speech, and Signal Processing. Part 1, p. 189-92, vol. 1.

Development of an effective context-free parser for continuous stochastic languages By: L.R. Strydom et al., AFRICON 96'. Incorporating AP-MTT-96 and COMSIG-96.

Reliable utterance segment recognition by integrating a grammar with statistical language constraints By: H. Tsukada et al., Speech Communication vol. 26, No. 4, p. 299-309.

Active middleware services in a decision support system for managing highly available distributed resources By: S.A. Fakhouri et al., International Conf. On Distributed Systems Platforms and Open Distributed Processing. Lecture Notes in Computer Science vol. 1795, p. 349-71.

Improving scalability of event-driven distributed objects architectures. By: D. Mencnarowski et al., Poland Journal: Software-Practice and Experience vol. 30, No. 13, p. 1509-29.

Improved spelling recognition using a tree-based fast lexical match. By: C.D. Mitchell et al., 1999 IEEE International Conf. On Acoustics, Speech and Signal Proceedings. vol. 2, p. 597-600.

Event management components for the 3/sup rd/ generation OSS By: S, Desrochers et al., Proceedings of Network Operations and Management Symposium Conference Date: Apr. 10-14, 2000 Conference Location: Honolulu, HI, USA.

A context-dependent similarity measure for strings By: E. Tanaka. Transactions of the Institute of Electronics and Communication Engineers of Japan, Part A, VO.. J67A, No. 6, p. 612-13.

Ready: a high performance event notification service By: Gruber, R.E. et al. Proceedings 16th International Conference on Data Engineering Conference Sponsor: IEEE Comput. Soc. Tech. Committee on Data Eng. Conference Date: Feb. 29-Mar. 3, 2000 Conference Location: San Diego, CA, USA.

An event notification framework based on Java and CORBA By: Tomono, M. Japan Conference Title: Integrated Network Management VI. Distributed Management for the Networked Millennium.

Mobile streams By: Ranganathan, M et al., Proceedings of the Sixth Annual Tcl/Tk Conference p. 203-4 Publisher: USENIX Assoc, Berkeley, CA, USA Publication Date: 1998.

A flexible and recoverable client/server database event notification system By: Hanson, E.N. et al., VLDB Journal vol. 7, No. 1 p. 12-24, 1998.

Using events to build distributed applications Author(s): Bacon, J. et al., Second International Workshop on Services in Distributed and Networked Environments Conference Sponsor: IEEE Comput. Soc. Tech. Committee on Distributed Process Conference Date: Jun. 5-6, 1995.

High-Performance Alphabet Recognition, IEEE Speech and Audio Processing, By: Philipos C. Loizue et al. Nov. 1996, vol. 4, No. 6, pp. 430-445.

Speaker-Independent Name Retrieval From Spellings Using a Database of 50,000 Names, By: Ronald A. Cole et al., 1991 International Conference on Acoustics, Speech, and Signal Processing vol. 5, pp. 325-328.

IBM Voicetype Software, By: R. Fletcher, IEE Colloquium on the Language Toolkit Engineers in Business.

Temporal Decomposition and Acoustic-Phonetic Decoding for the Automatic Recognition of Continuous Speech By: P. Deleglise et al. 9th International Conference on Pattern Recognition. vol. 11, pp. 839-841.

Improving Recognizer Acceptance Through Robust, Natural Speech Repair By: Arthur E. McNair et al., 1994 International Conference on Spoken Language Processing. pp. S22-15.1-S22-15.4.

Automated Directory Listing Retrieval System Based on Isolated Word Recognition By: Bernd Aldefeld et al., Proceedings of the IEEE, vol. 68, No. 11, Nov. 80 pp. 1364-1379.

Empirical evaluation of interactive multimodal error correction, By: Suhm, B., 1997 IEEE Workshop on Automatic Speech Recognition and Understanding Proceedings.

Noise robust speech recognition makes in-car navigation safe and affordable By: Smolders, J. et al. 'Steps Forward'. Proceedings of the Second World Congress on Intelligent Transport Systems '95 Yokohama Part vol. 2 p. 601-4 vol. 2.

Building a listener engine: a Smalltalk interface to speech recognition By: LaLonde, W., Pugh, J. Journal: Journal of Object Oriented Programming (JOOP) vol. 10, No. 7 1997-1998.

LEAP: Language Enabled Application By: Alabiso, B. ; Kronfeld, a. First International Workshop on Human-Computer Conversation. Draft Proceedings p. 15.

Tools for developing voice-operated applications By: Newstadt, R.E., Speech Technology vol. 4, No. 4, p. 62-6.

Examining Microsoft's Speech SDK By: Davis, P., Dr. Dobb's Journal vol. 24, No. 7 p. 86, 88-90. 1999.

Speech processing technology towards practical use By: Shirai, K.; Kobayashi, T.; Kudo, I., Joho Shori vol. 38, No. 11 p. 971-5.

Recent improvements on Microsoft's trainable text-to-speech system- Whistler By: Haung, X et al., 1997 IEEE International Conference on Acoutics, Speech and Signal Processing (Cat. No. 97CB36052) Part vol. 2 p. 959-62 vol. 2.

Software text-to-speech By: Hallahan, W.J.; Vitale, A.J., Journal: International Journal of Speech Technology vol. 1, No. 2 p. 121-34.

Japanese text-to-speech software (FLUET) based on waveform synthesis method By: Hakoda, K.; Tsukada, H.; Hirokawa, T.; Yoshida, Y.; Mizuno, H.

Hataoka et al. "Sophisticated Speech Processing Middleware on Microprocessor", 1999 IEEE 3$^{rd}$ Workshop on multimedia signal processing: Copenhagen, Sep. 13-15, 1999.

DECtalk Software: text-to-speech technology and implementation By: Hallahan, W.I., : Digital Technical Journal vol. 7, No. 4 p. 5-19.

The InfoPad user interface By: Burstein, A. et al., Digest of Papers. COMPCON '95., Technologies for the Information Superhighway.

Context Free Grammar Engine for Speech Recognition System, U.S. Appl. No. 09/751,613, filed Dec. 29, 2000, Philipp H. Schmid et al.

* cited by examiner

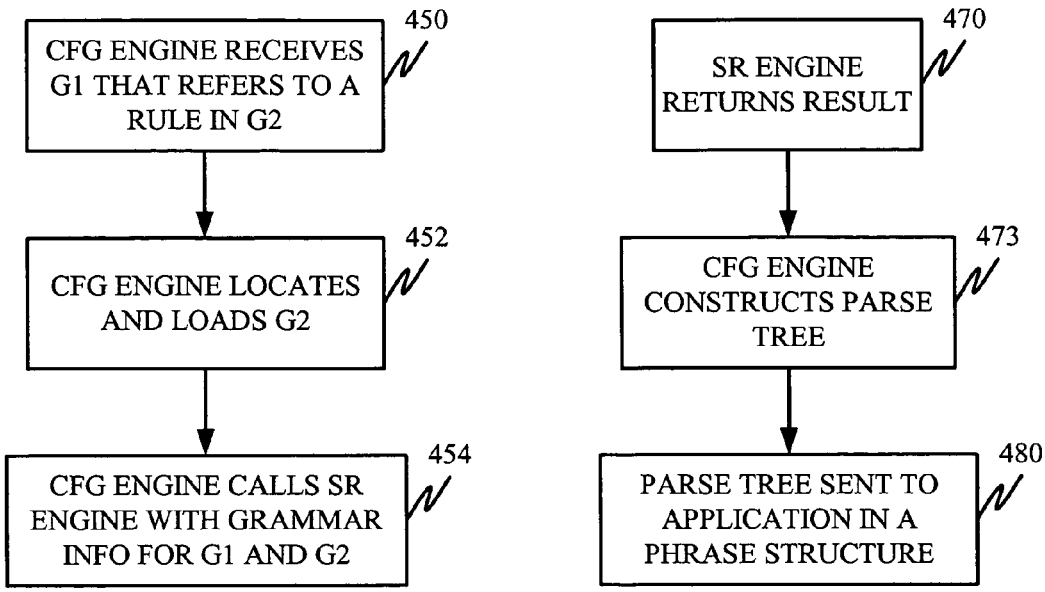
FIG. 8
FIG. 9
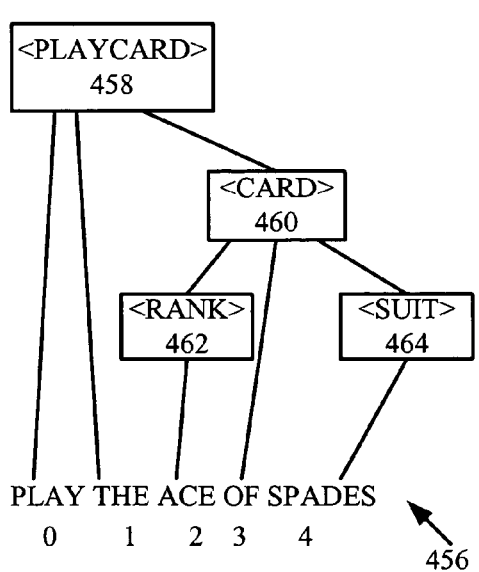
FIG. 10
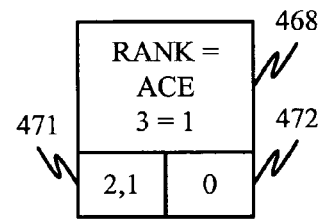
FIG. 11

CONTEXT FREE GRAMMAR ENGINE FOR SPEECH RECOGNITION SYSTEM

REFERENCE TO CO-PENDING APPLICATION

The present application is a continuation of and claims priority of U.S. patent application Ser. No. 09/751,613, filed Dec. 29, 2000 now U.S. Pat. No. 6,957,184; U.S. Provisional Patent Application Ser. No. 60/219,861, filed on Jul. 20, 2000, the content of which is hereby incorporated by reference in its entirety.

REFERENCE TO CO-PENDING APPLICATION

U.S. patent application Ser. No. 09/751,836, entitled MIDDLEWARE LAYER BETWEEN SPEECH-RELATED APPLICATIONS AND ENGINES, filed on Dec. 29, 2000, the content of which is hereby incorporated by reference in its entirety.

BACKGROUND OF THE INVENTION

The present invention deals with speech recognition systems. In particular, the present invention relates to a context free grammar engine for use in speech recognition systems.

In speech recognition systems, a computer system attempts to identify a sequence of words from a speech signal. One way to improve the accuracy of the recognition is to limit the recognition to a set of selected phrases. This is typically done by limiting valid recognition hypotheses to phrases that are found in a context-free grammar (CFG).

In the past, applications which invoked speech recognition engines communicated directly with the engines. Because the engines from each vendor interacted with applications directly, the behavior of that interaction was unpredictable and inconsistent. This made it virtually impossible to change recognition engines without inducing errors in the application. It is believed that, because of these difficulties, speech recognition technology has not quickly gained wide acceptance.

In an effort to make such technology more readily available, an interface between engines and applications was specified by a set of application programming interfaces (API's) referred to as the Microsoft Speech API version 4.0 (SAPI4). Though the set of API's in SAPI4 specified direct interaction between applications and engines, and although this was a significant step forward in making speech recognition and speech synthesis technology more widely available, some of these API's were cumbersome to use, required the application to be apartment threaded, and did not support all languages.

The process of making speech recognition more widely available has encountered other obstacles as well. For example, many of the interactions between the application programs and the engines can be complex. Such complexities include cross-process data marshalling, event notification, parameter validation, default configuration, and many others. Conventional operating systems provide essentially no assistance to either application vendors, or speech engine vendors, beyond basic access to audio devices. Therefore, application vendors and engine vendors have been required to write a great deal of code to interface with one another.

In one particular example, where one or more applications desires to use one or more grammars with a speech recognition engine, the speech recognition engine is required to keep track of individual grammar loads and to request additional grammars to be loaded for imported rules. Further, the speech recognition engine is often required to parse recognition results to provide the application with a desired parse tree structure. This consequently requires the speech recognition engine to perform a great many tasks other than simply recognizing speech from an audio input signal (or speech signal).

SUMMARY OF THE INVENTION

The present invention includes a context-free grammar (CFG) engine which communicates through an exposed interface with a speech recognition engine. The context-free grammar engine, in one illustrative embodiment, handles loading and unloading of grammars, as well as maintaining a desired activation state of the grammars which are loaded. Further, the CFG engine represents all loaded grammars, and their corresponding activation states, as a single grammar to the speech recognition engine.

In yet another embodiment, the CFG engine can be called, through an interface, by the SR engine to perform parsing services. This relieves the SR engine of substantially all tasks, except simply recognizing speech from an input signal.

A set of interface methods are also provided such that the speech recognition engine can query the CFG engine about new grammars, words, transitions and rules. This allows the SR engine to build an internal representation of the active grammars maintained by the CFG engine.

In still another embodiment, the CFG engine builds a rich structure from the recognition results provided by the speech recognition engine. This result is, in turn, provided to the application, through exposed interface methods.

BRIEF DESCRIPTION OF THE DRAWINGS

FIG. 8 is a flow diagram illustrating loading of external grammars, referred to by a loaded grammar.

FIGS. 9–11 illustrate parsing of a speech recognition result returned by the speech recognition engine.

DETAILED DESCRIPTION OF THE ILLUSTRATIVE EMBODIMENTS

Figure 1:
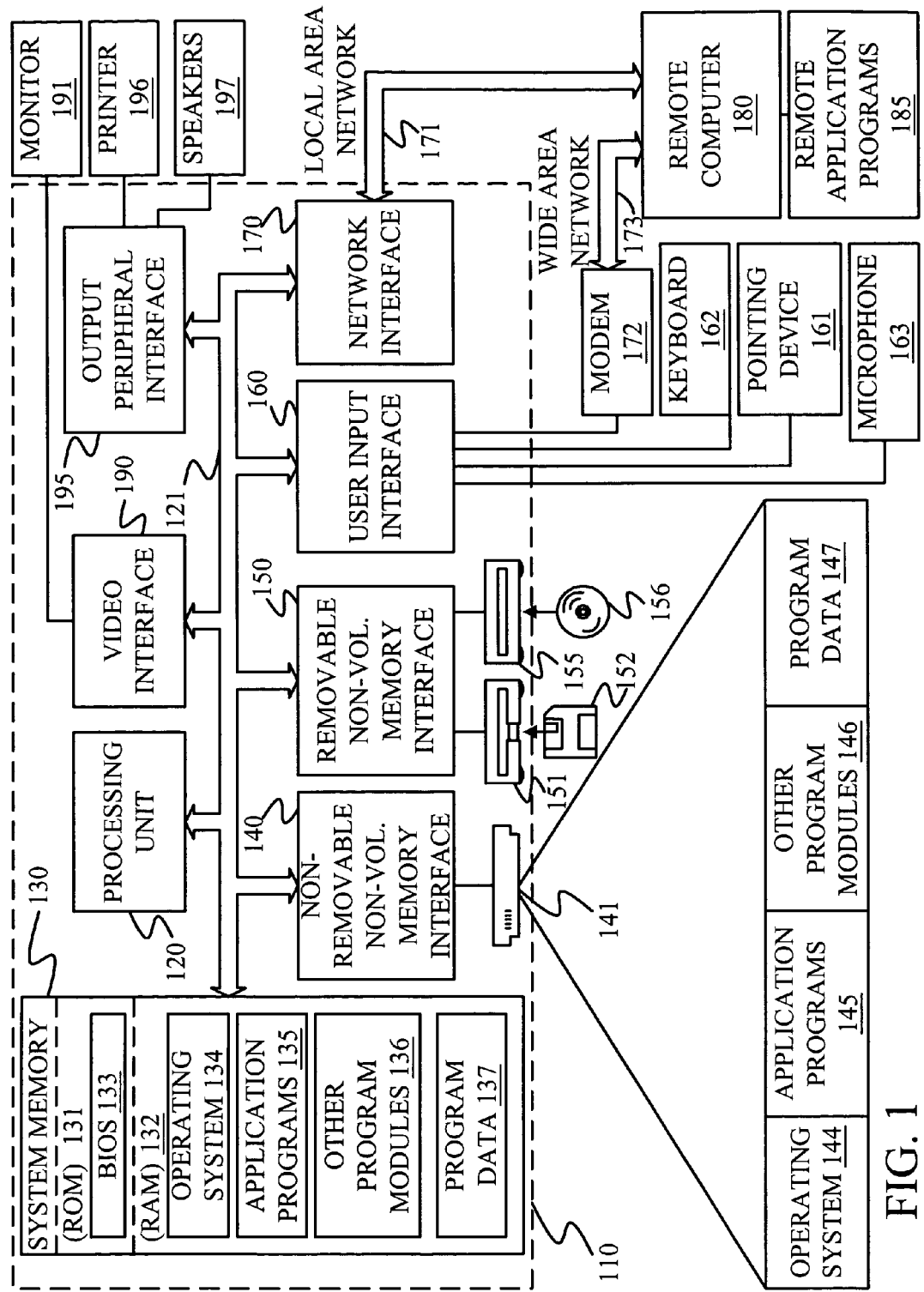
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
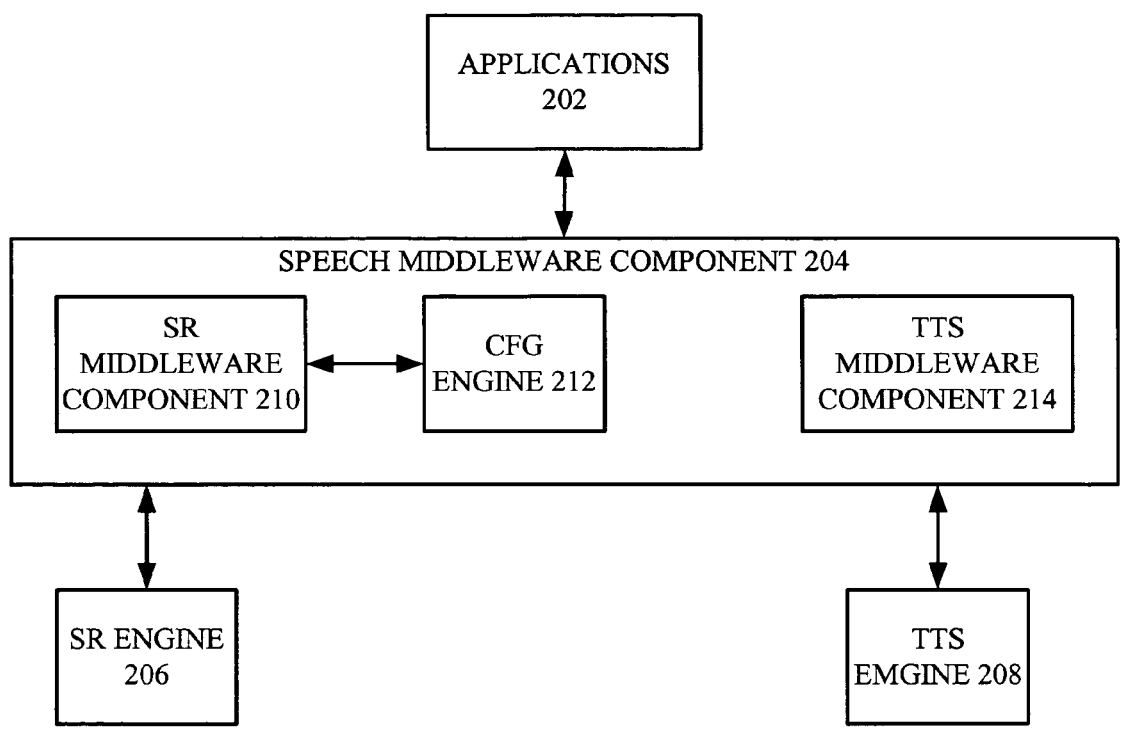
FIG. 2 is a block diagram of the speech recognition system in accordance with one embodiment of the present invention.

FIG. 2 is a more detailed block diagram of a speech recognition system 200 in accordance with one embodiment of the of the present invention. It should be noted that speech recognition system 200 can be incorporated into the environment illustrated in FIG. 1. Speech recognition system 200 includes one or more speech recognition applications 202, speech middleware component 204, one or more speech recognition engines 206 and one or more text-to-speech engines (synthesizers) 208.

In one illustrative embodiment, speech middleware component 204 is implemented in the operating system 134 illustrated in FIG. 1. Speech middleware component 204, as shown in FIG. 2, includes speech recognition middleware component 210, context free grammar (CFG) engine 212 and text-to-speech (TTS) middleware component 214.

A detailed description of the operation of speech middleware component 204 is provided in the above-identified, and incorporated, co-pending patent application. For a full understanding of the present invention, however, only a short description of the operation of that component is warranted.

Briefly, in operation, speech middleware component 204 resides between applications 202 and engines 206 and 208. Applications 202 can be speech recognition and speech synthesis applications which desire to invoke engines 206 and 208. In doing so, applications 202 make calls to speech middleware component 204 which, in turn, makes calls to the appropriate engines 206 and 208 in order to have speech recognized or synthesized.

For example, applications 202 may provide the source of audio data for speech recognition. Speech middleware component 204 passes that information to speech recognition engine 206 which simply recognizes the speech and returns a recognition result to speech recognition middleware component 210. Speech recognition middleware component 210 places the result in a desired format and returns it to the application 202 which requested it.

CFG engine 212, briefly, assembles and maintains grammars which are to be used by speech recognition engine 206. This allows multiple applications and multiple grammars to be used with a single speech recognition engine 206. This is discussed in greater detail later in the specification.

Figure 3:
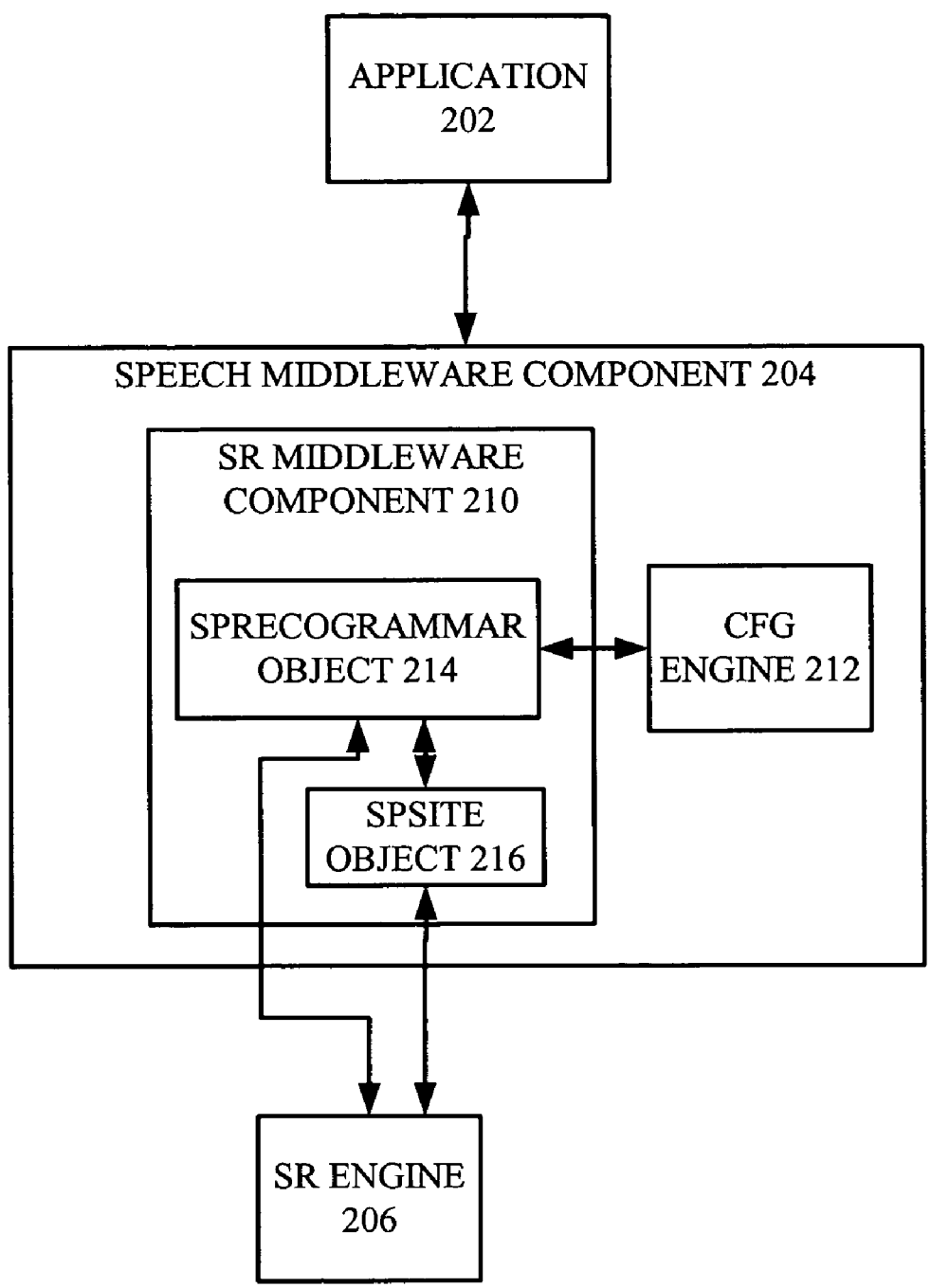
FIG. 3 is a more detailed block diagram of a portion of the speech recognition system shown in FIG. 2.

FIG. 3 is a more detailed block diagram of a portion of system 200 shown in FIG. 2. More specifically, FIG. 3 illustrates SR middleware component 210 in greater detail, as it relates to the present invention. FIG. 3 shows that SR middleware component 210 includes SpRecoGrammar object 214 and SpSite object 216. SpRecoGrammar object 214 and SpSite object 216 are also described in greater detail in the above-identified co-pending application. However, for the sake of the present invention, it is only important to know that the SpRecoGrammar object represents the grammar which SR engine 206 will be listening to. The SpRecoGrammar object 214 can be associated with a number of different grammars. In addition, the SpRecoGrammar object 214 exposes methods to provide an interface to application 202 and SR engine 206, and allow them to communicate with CFG engine 212.

It is also sufficient to know, for the purposes of the present invention, that the SpSite object 216 is the object which SR engine 206 calls to communicate events and recognitions, and to make other communications with, the SpRecoGrammar object 214.

CFG engine 212 is configured to maintain the grammars which are accessible by SR engine 206, through the interface provided by SpRecoGrammar object 214. In doing so, CFG engine 212 allows additional grammars to be loaded and made accessible to SR engine 206. CFG engine 212 also enables SR engine 206 to build an internal representation of the grammars which are loaded. CFG engine 212 also enables application 202 to load or unload additional grammars, implement dynamic grammars by making changes to the content of loaded grammars, and to load nested grammars. In addition, CFG engine 212 can be called, through the interfaces provided by the SpRecoGrammar object 214, by SR engine 206. SR engine 206 can request that its results be parsed by CFG engine 212 to alleviate SR engine 206 of the parsing burden. CFG engine 212 also creates a rich result which is returned through the interfaces provided by the SpRecoGrammar object 214 to application 202.

Figure 4A:
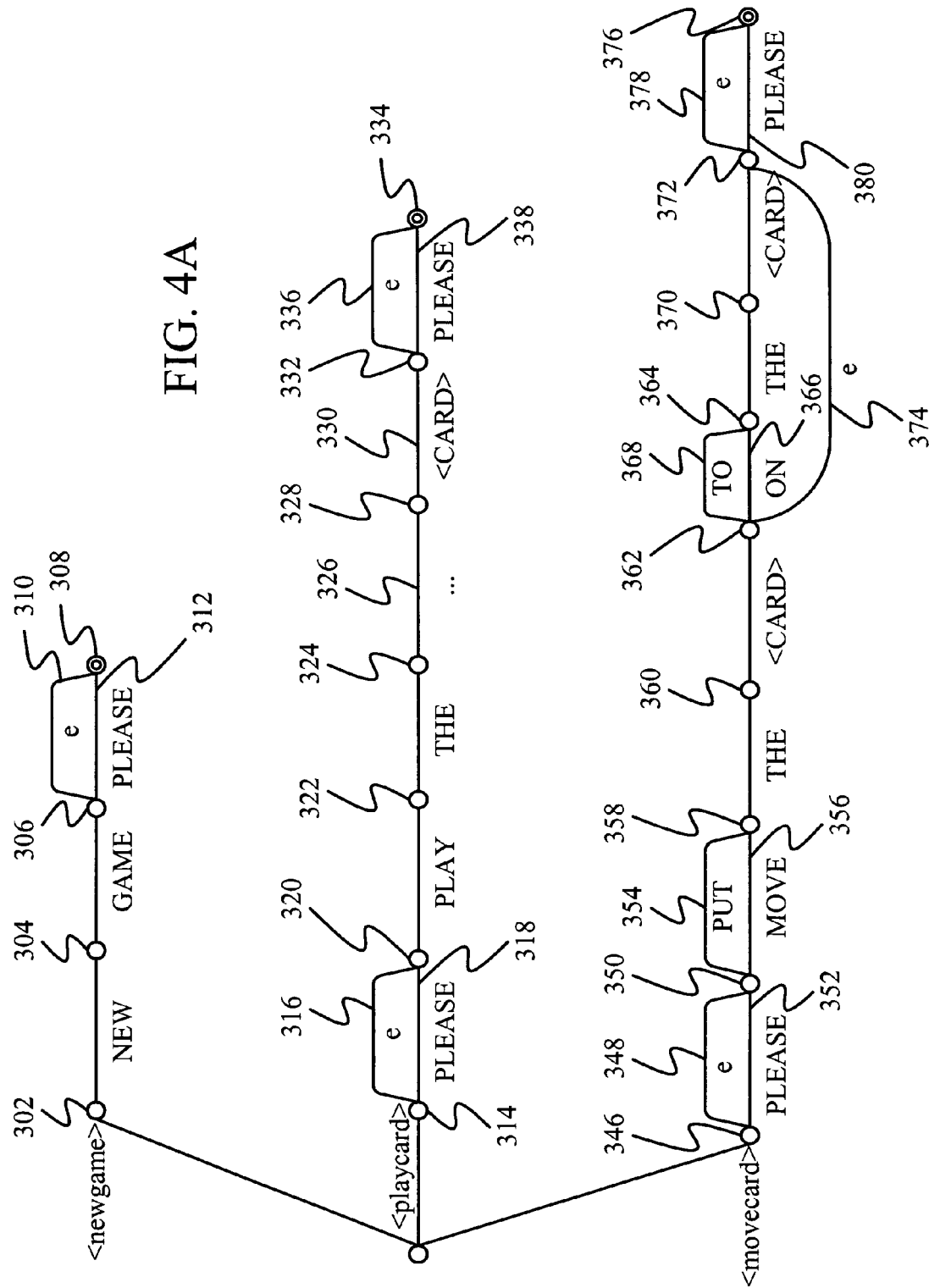
FIG. 4A is a state diagram showing the grammar structure for a set of grammar rules.
Figure 4B:
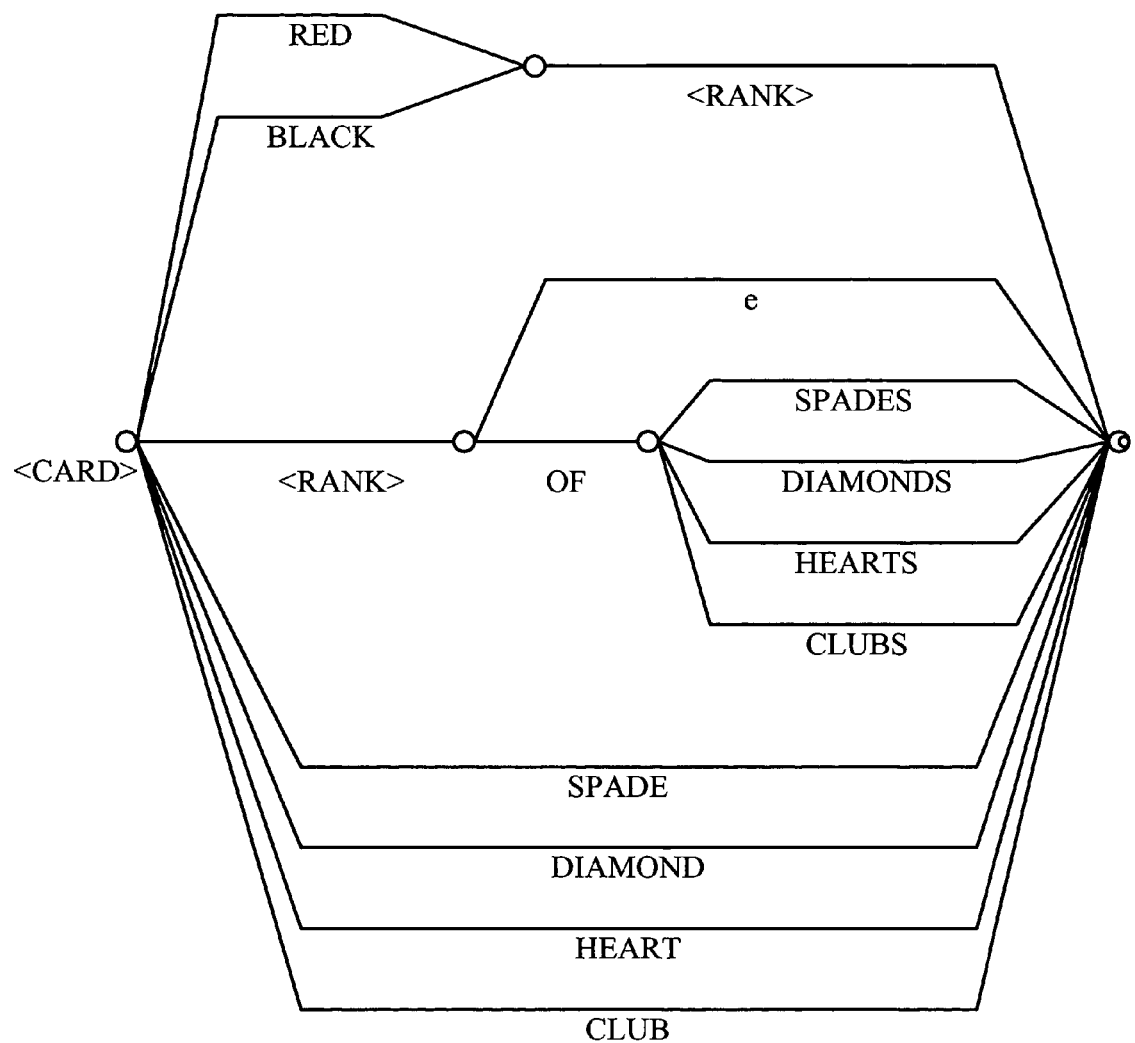
FIG. 4B is a state diagram showing the grammar structure for a single grammar rule.

In order to better understand certain aspects of the present invention, it is useful to understand the general structure of grammar rules which are used by SR engine 206 in recognizing speech. A brief discussion of such a grammar structure is now provided with respect to FIGS. 4A and 4B. FIG. 4A is a state diagram showing the grammar structure for a set of grammar rules, while FIG. 4B is a state diagram showing the grammar structure for a single rule.

More specifically, FIG. 4A provides an example of a state diagram showing three top-level grammar structures, or rules, derived from a text-formatted grammar. In FIG. 4A, the three grammar structures are <newgame>, <playcard>, and <movecard> which begin at nodes 302, 314, and 346, respectively.

The newgame grammar structure has a transition from starting node (or state) 302 to node (or state) 304 that is associated with the word "new". From state 304 to state 306, this structure has a second word transition associated with the word "game". After state 306, there are two parallel transitions 310 and 312 to a final state 308. Transition 310 is an epsilon transition indicating that word transition 312, which is associated with the word "please", is optional.

During speech recognition, speech recognition engine 206 traverses the state diagram to determine whether the speech signal it is recognizing corresponds to any of the grammar structures. For example, speech recognition engine 206 will identify the <newgame> structure as corresponding to the input speech signal if the word "new" is found at the beginning of the speech signal followed by the word "game". Note that since the word "please" is optional in the <newgame> structure, speech recognition engine 206 will identify the newgame structure even if the word "please" is not found in the speech signal.

The <playcard> grammar structure, which starts at node 314, is more complex than the <newgame> structure. From starting node 314, the <playcard> structure has an epsilon transition 316 and a word transition 318 that both end at state 320. Epsilon transition 316 indicates that the "please" associated with word transition 318 is optional. From state 320, there are two consecutive word transitions leading respectively to state 322 and state 324. These word transitions are associated with the words "play" and "the", respectively.

From state 324 to state 328, the <playcard> structure has a wildcard transition 326. During this transition, speech recognition engine 206 will ignore any input provided by the user after the word "the" and before words associated with a <card> grammar structure which is found transition 330 from state 328 to state 332. Thus, no matter what the user says during transition 326, speech recognition engine 206 can still identify the <playcard> structure as being recognized for the speech signal.

Transition 330 of the <playcard> structure is a grammar structure transition. When speech recognition engine 206 encounters this transition, it substitutes the entire state diagram of the referenced grammar structure in place of the grammar structure transition. For example, speech recognition engine 204 replaces transition 330 with the state diagram of FIG. 4B, which represents the <card> grammar structure. It then determines if the input speech signal can be represented by part of the complete <playcard> grammar structure including the portion of that structure provided by the <card> grammar structure.

From state 332 to end state 334 of the <playcard> structure, there is an epsilon transition 336 and a word transition associated with the word "please". Epsilon transition 336 indicates that the word "please" is optional in the <playcard> structure.

The <movecard> structure associated with start node 346 begins with an epsilon transition 348 to state 350. Epsilon transition 348 is in parallel with a word transition 352 associated with the word "please". As such, the word "please" is optional.

From state 350 to state 358, the <movecard> structure provides two parallel transitions 354 and 356 associated with the words "put" and "move", respectively. Thus, if the user says either "put" or "move", the speech recognition engine 206 will identify these portions of the speech signal with the <movecard> structure.

From state 358 to state 360, there is a single word transition associated with the word "the". From state 360 to state 362, the <movecard> structure provides a grammar structure transition associated with the <card> grammar structure.

From state 362 to state 364, there are two parallel word transitions 366 and 368, associated with the words "on" and "to", respectively. A word transition for the word "the" extends from state 364 to state 370, which is followed by a grammar structure transition to state 372 for the <card> grammar structure.

An epsilon transition extends from state 362 to state 372. This epsilon transition indicates that the transitions between states 362, 364, 370, and 372, are all optional. As such, the words associated with these transitions do not need to be present in the speech signal in order for speech recognition engine 206 to identify the <movecard> structure from the speech signal.

From state 372 to end state 376 there is epsilon transition 378 in parallel with a word transition 380. Epsilon transition 378 indicates that the word "please" associated with transition 380 is optional.

Figure 5:
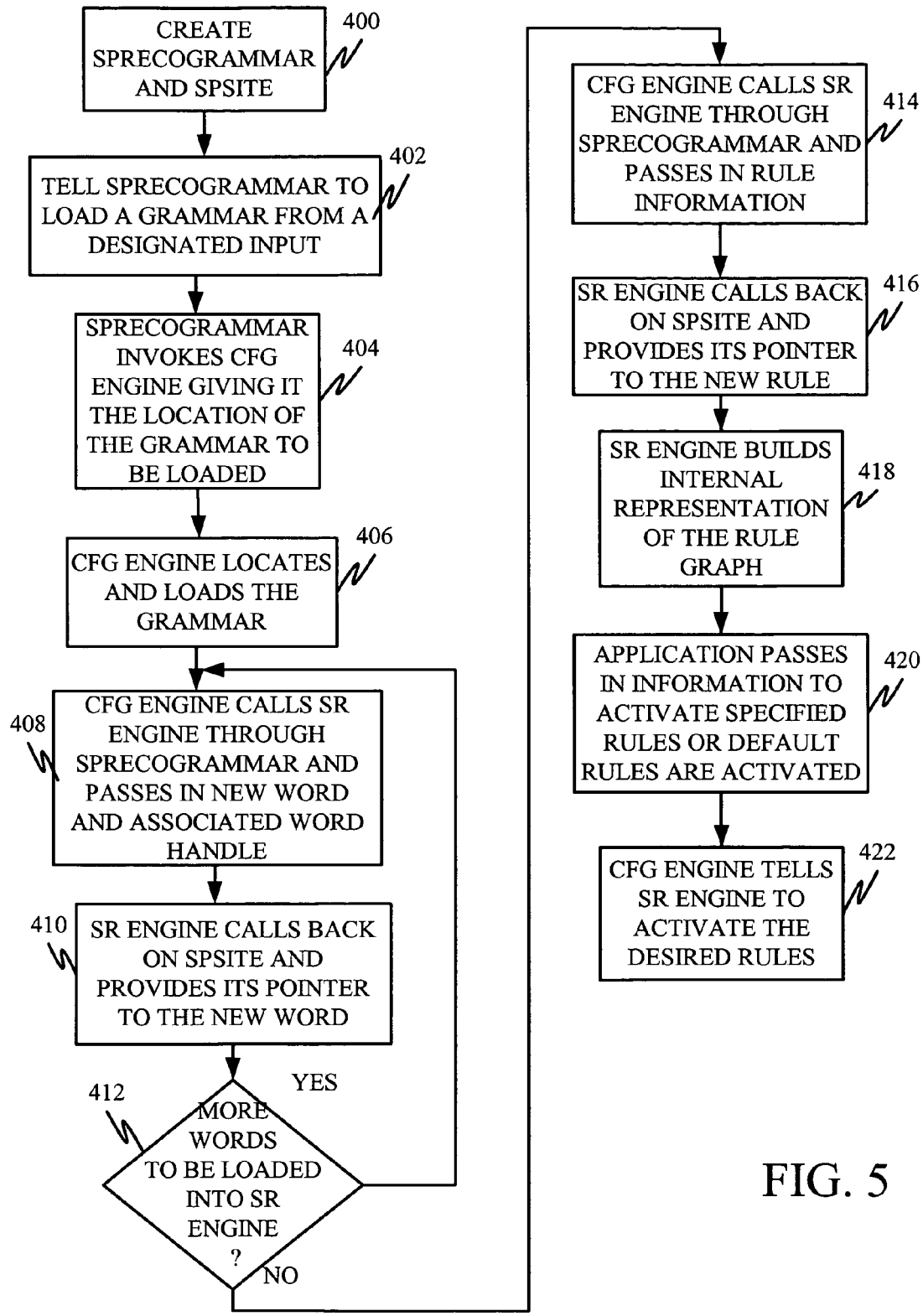
FIG. 5 is a flow diagram illustrating how a grammar is loaded from an application in accordance with one embodiment of the present invention.

FIG. 5 is a flow diagram illustrating the general operation of the system shown in FIG. 3 loading a grammar from an application 202. First, application 202 calls an exposed method on an interface provided by SR middleware component 210 to create the SpRecoGrammar object 214 and the SpSite object 216. This is indicated by block 400.

Application 202 then indicates to SpRecoGrammar object 214, by calling an exposed method, that application 202 desires to load a grammar from a designated input. In one illustrative embodiment, SpRecoGrammar object 214 exposes four different methods which are used by the application, depending upon the source of the grammar. Those methods, for example, can allow the application 202 to load a grammar from a file, from a memory location, from a resource, or from an object. Of course, other sources could be provided as well. This is indicated by block 402.

The SpRecoGrammar object 214 then invokes CFG engine 212 providing it with the location of the grammar to be loaded. It should be noted that, in many embodiments, SR engine 206 can only operate on a binary grammar. Therefore, CFG engine 212 locates the grammar to be input. If it is in a binary grammar format, processing simply continues. If it is in a text format, it is illustratively compiled on-the-fly, in to a binary grammar. In any case, once the grammar is located and is in binary form, CFG engine 212 loads the grammar into associated memory. In loading the grammar, CFG engine 212 internally maintains a store which indicates where all of the rules in each loaded grammar are from. In other words, given a rule identifier, CFG engine 212 can determine which grammar that particular rule belongs to. Invoking CFG engine 212 and loading the grammar are indicated by blocks 404 and 406.

Once the grammar is loaded, CFG engine 212 calls SR engine 206 through the interfaces provide by the SpRecoGrammar object 214 and passes in all of the new words associated with the grammar which has just been loaded, along with handles to the new words provided by CFG engine 212. This is indicated by block 408. In response to receiving the new words, SR engine 206 calls back on SpSite 216 and provides its internal pointer (the pointer internal to SR engine 206) to the new words which it has just received. This is indicated by block 410. Therefore each time CFG engine 212 calls SR engine 206 in relation to a given word, it identifies that word to SR engine 206 by providing the internal pointer which SR engine 206 uses for that word. Similarly, when SR engine 206 calls back to SpSite 216, in relation to any word, it provides the pointer, or handle, which CFG engine 212 generated for that word.

CFG engine 212 continues loading in new words and word handles, and receiving the internal pointer to those words from SR engine 206, until no new words are left to be loaded. This is indicated by block 412.

Once all of the new words are loaded, CFG engine 212 calls SR engine 206 through the SpRecoGrammar object 214 and passes in the rule information associated with the grammar which has just been loaded. Such rule information illustratively includes the rule identification number (rule ID), the rule name, the level of the rule (i.e., whether it is a top level rule) and whether the rule is active or inactive, by default. Passing in the rule info is indicated by block 414 in FIG. 5.

As with new words, SR engine 206 then calls back on SpSite 216 providing its internal pointer to the new rules which have just been identified to it. This is indicated by block 416. Again, each time CFG engine 212 refers to a rule in communicating with SR engine 206, it provides the internal pointer for SR engine 206, associated with that rule. SR engine 206, in turn, provides the handle or rule ID generated by CFG engine 212 for the associated rules as well.

Once CFG engine 212 has communicated all of the words in the new grammar and identified the rules in the new grammar to SR engine 206, SR engine 206 makes a series of calls to CFG engine 212, through SpSite 216 and the SpRecoGrammar object 214 such that SR engine 206 can build an internal representation of the rule structure corresponding to each of the rules in the new grammar. This is indicated by block 418. This process is also described in greater detail below with respect to FIG. 6.

Once SR engine 206 has built its internal representation of the new grammar rules, the application 202 passes in information telling CFG engine 212 to either activate or deactivate specified rules. In the absence of this information, CFG engine 212 simply activates the default rules in the new grammar. This is indicated by block 420 in FIG. 5. The CFG engine 212 then makes appropriate calls to the SR engine 206, through the SpRecoGrammar object 214, to active and deactivate the desired rules. This is indicated by block 422.

At this point, the entire new grammar has been loaded not only into CFG engine 212 (or its associated memory), but the appropriate grammar structures have also been created by SR engine 206 so that it can now begin recognition using the new grammar.

It should also be noted that grammars can be removed in substantially the reverse process as that illustrated by FIG. 5. In other words, application 202 calls CFG engine 212 through the SpRecoGrammar interfaces to remove a grammar. The CFG engine 212 calls the SR engine 206 through the appropriate interface to remove the words and rules associated with that grammar. Similarly, in order to add another grammar, the process illustrated by FIG. 5 is simply repeated. Further, if application 202 wishes to activate or deactivate rules in a dynamic grammar, it simply provides an indication of that, through the interfaces provided by the SpRecoGrammar 214, to CFG engine 212. CFG engine 212 then notes which rules have been activated or deactivated and calls SR engine 206, through the interfaces provided by SpRecoGrammar object 214, with appropriate calls to active or deactivate the specified rules.

In this way, multiple grammars can be used and loaded by application 202, and they are all maintained by CFG engine 212. CFG engine 212 represents all of the combined grammars as a single grammar to SR engine 206. SR engine 206 therefore need not know, and need not track, multiple grammars, dynamic grammars, etc. It simply builds an internal representation of the new rules added by CFG engine 212, or it deletes its representation of rules and words which are removed by CFG engine 212. It also simply activates or deactivates rules, as indicated by CFG engine 212. This significantly relieves the burden on SR engine 206, and leaves it to simply do speech recognition, based on an input audio signal or speech signal.

Figure 6:
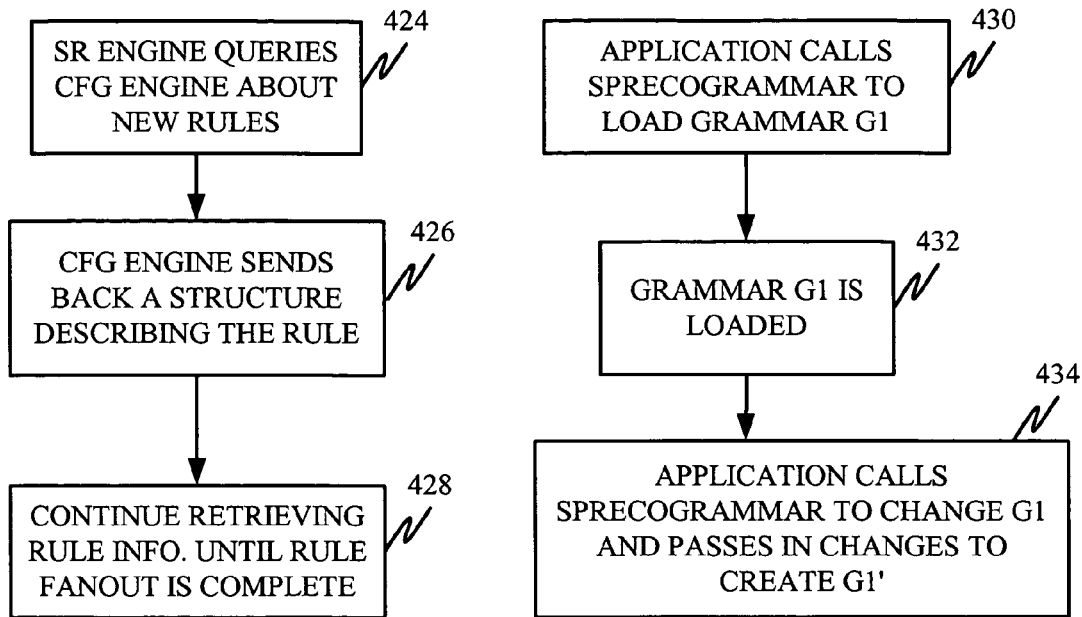
FIG. 6 is a flow diagram illustrating how a speech recognition engine builds an internal representation of the loaded grammar.

FIG. 6 is a flow diagram which better illustrates how SR engine 206 builds its internal representation of the grammar provided by CFG engine 212. Upon being provided with an indication that a new rule has been added (as indicated by block 414 in FIG. 5), SR engine 206 queries CFG engine 212 (through SpSite 216) about the new rule. In doing so, SR engine 206 provides the internal handle (or rule ID) generated by CFG engine 212 to identify that rule. This is indicated by block 424 in FIG. 6.

In response, CFG engine 212 sends back a structure describing the rule. For example, if CFG engine 212 is describing the <newgame> rule shown in FIG. 4A, CFG engine 212 first provides the rule ID, the rule name (newgame), an indication that <newgame> is a top-level rule and an indication of whether the rule is active or inactive, by default. SR engine 206 then queries CFG engine 212, through SpSite 216, for more information, as indicated by block 424 in FIG. 6. In response, CFG engine 212 sends back an indication first indicating that the transition following state 302 is a word transition and the word is "new". CFG engine 212 also provides an indication as to the identity of the next state 304.

SR engine 206 then has a choice as to how to proceed. In accordance with one illustrative embodiment, SR engine 206 simply waits until it recognizes the word "new" and realizes that it is potentially starting down the tree structure of the "newgame" rule. In that case, SR engine 206 then queries CFG engine 212 as to any additional fanout for the rule. For instances, SR engine 206 may then ask what the next transition is in the rule, if there is one. At that point, CFG 212 engine provides an indication that the transition from state 304 is another word transition, the word is "game" and also provides the identity of state 306. In this way, SR engine 206 only builds the internal structure of the entire rule, as the text associated that rule is being recognized.

In accordance with another illustrative embodiment, SR engine 206 continues to query CFG engine 212 to obtain the full fanout for all rules, even before recognition has begun. In this way, SR engine 206 can obtain all necessary information to build all the internal structures which will represent the rules, prior to beginning recognition. Having SR engine 206 retrieve the rule information to complete its internal structure of the rules (whether it is done prior to speech recognition, or during speech recognition) is illustrated by block 428 in FIG. 6.

Figure 7:
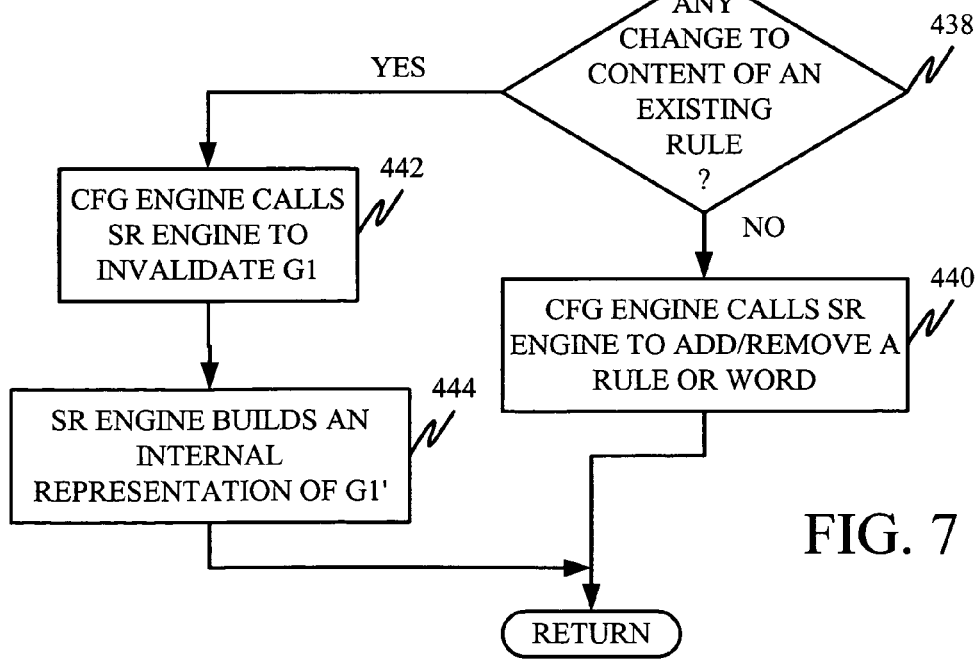
FIG. 7 is a flow diagram illustrating how grammar content is changed in accordance with one embodiment of the present invention.

FIG. 7 is flow diagram better illustrating the implementation of dynamic grammars using CFG engine 212. By dynamic grammars it is meant a grammar which has already been loaded into CFG engine 212 and SR engine 206, which now has a change to the content of one of its rules. That change is now to be provided from application 202 to SR engine 206. FIG. 7 illustrates this process in greater detail.

First, application 202 calls the interfaces provided by SpRecoGrammar object 214 to load a grammar G1. This is indicated by block 430. The grammar G1 is the loaded by CFG engine 212, as indicated with respect to FIGS. 5 and 6 above. This is indicated by block 432. The application 202 then calls an exposed method on the interface implemented by SpRecoGrammar object 214 to change the grammar. In making this call, application 202 illustratively passes in the changes in grammar G1 to create a new grammar G1'. This is indicated by block 434. This grammar G1' is passed from the SpRecoGrammar object 214 to CFG engine 212, and CFG engine 212 compares the grammar G1' to grammar G1 which is already loaded. This is indicated by block 436. In order to do this comparison, CFG engine 212 illustratively compares the word lists associated with grammars G1 and G1' to see if any words have been changed, deleted, or added. CFG engine 212 also illustratively compares the rule table associated with the two grammars to see if any rule content has changed.

If CFG engine 212 determines that there has been no change to the content of any existing rule, as illustrated by block 438, CFG engine 212 simply calls the engine 206 to add or remove rules or words from the grammar. This is done as described with respect to FIGS. 5 and 6 above, and is illustrated by block 440 in FIG. 7.

However, if at block 438 it is determined that there is a change to the content of an existing rule, then CFG engine 212 calls SR engine 206 to invalidate grammar G1. This is indicated by block 442. Once that grammar has been invalidated, SR engine 206 makes appropriate calls to the CFG engine 212 through SpRecoGrammar object 214, to build its internal representation of the grammar G1'. This is indicated by block 444. It should again be noted that SR engine 206 can build the entire grammar prior beginning speech recognition, or it can simply build enough grammar to begin speech recognition then build the remaining structures, as needed, during the recognition process.

Another aspect of the present invention involves additional referenced grammars. CFG engine 212 loads grammars which are referred to by other grammars. For instance, in the above example, grammar G1 may refer to a rule in another grammar, G2. If that happens, CFG engine 212 locates, and loads, Grammar G2 such that it can represent the entire grammar as a single grammar to SR engine 206. FIG. 8 is a flow diagram which better illustrates this process.

CFG engine 212 first receives a grammar, G1, that refers to a rule in another grammar G2. This is indicated by block 450 in FIG. 8. CFG engine 212 then locates and loads grammar G2, as indicated above with respect to FIG. 5. This is indicated by block 452. CFG engine 212 then calls SR engine 206 (through SpRecoGrammar object 214) with the grammar information related to grammar G1 (if it has not done so already) and with the grammar information related to grammar G2. This is indicated by block 454. It should be noted that CFG engine 212 can load the entire grammar G2 into SR engine 206, or it can simply load in the relevant rules from grammar G2.

It should also be noted that, should grammar G2 refer to yet another grammar G3, CFG engine 212 locates grammar G3, loads it, and loads all, or the relevant portions, of grammar G3 into SR engine 206. All of these steps (the loading of separate grammars, the identifying of separate grammars, and the tracking of rules for those grammars) is done transparently to SR engine 206. SR engine 206 simply receives rules and words and views them as a single grammar.

CFG engine 212 is also illustratively configured to parse a result from SR engine 206 and to provide a more rich result back to application 202. FIGS. 9–11 illustrate the parsing of a result from engine 206. FIG. 9 is a flow diagram better illustrating how the parsing operation occurs. FIG. 10 is a parse tree which shows a recognized phrase 456 with elements numbered 0–4, and a plurality of rules 458, 460, 462, and 464 which were used to spawn the result. FIG. 11 illustrates a portion of a result which is generated by CFG engine 212.

In order to parse a phrase and generate a result, CFG engine 212 first needs a recognition result from SR engine 206. Therefore, SR engine 206 returns a result (such as rule ID and a transition sequence) to CFG engine 212, through SpSite 216. This is indicated by block 470 in FIG. 9. The rule ID represents the particular rule which fired to spawn the recognition result, and the transition sequence is a sequence of transition handles identifying transitions in the rule which generated the recognition result.

For example, assume that SR engine 206 recognized the phrase "play the ace of spades" illustrated by number 456 in FIG. 10. That phrase is composed of 5 elements (numbered 0–5). The <playcard> and <card> rules 458 and 460, respectively, are illustrated in FIGS. 4A and 4B. The "rank" and "suit" rules 462 and 464 are similar rules, but have not been set out in detail.

Each of the rules 458–464 has a rule ID associated with it. Also, as shown in FIGS. 4A and 4B, each rule has a plurality of possible transition sequences which can be followed to generate phases.

After receiving the recognition results, CFG engine creates a parse tree as indicated by block 473 in FIG. 9. In constructing a parse tree, CFG engine 212 identifies the rules and the elements in phrase 456 which the rule is responsible for. In other words, it can be seen in FIG. 10 that the rule <playcard> is responsible for elements 0 and 1 in phrase 456. <Card> rule 460 is responsible for element 3 while <rank> rule 462 is responsible for element 2 and <suit> rule 464 is responsible for element 4. The rule ID's and transition sequences provided by SR engine 206 allows CFG engine 212 to internally create the parse tree identified by FIG. 10 for phrase 456.

FIG. 11 shows a number of different ways for doing this. For example, CFG engine 212 could simply indicate that "rank=ace" in showing the result of rule 462. However, CFG engine 212 can also use values to indicate the words in the "rank=ace" term. For example, assume that the <rank> rule has a rule ID of 3. Also assume that the "ace" corresponds to a value of 1 in rule 3. Then, CFG engine 212 can represent the <rank> rule and the corresponding result by simply indicating "3=1" as indicated in field 468 in FIG. 11.

Similarly, CFG engine 212 can provide any suitable way of indicating which elements 0–4 correspond to which rules 458–464. One embodiment of this is shown in field 471 in FIG. 11. In that field, two integers are separated by a comma. The first integer is indicative of the element in phrase 456 while the second integer indicates the span of elements in phrase 456 corresponding to the <rank> rule identified in field 468. Therefore, it can be seen that the <rank> rule has generated the element number 2 in phrase 456 and only element number 2 (because the integer representing the span of elements is set to 1).

FIG. 11 also shows that the result can contain another field 472 which is indicative of a confidence measure of the recognition result. A number of different confidence measures value can be used. For example, SR engine 206 may have a proprietary confidence measure which it generates, and that confidence measure can be placed in field 472. Similarly, CFG engine 212 can generate a confidence measure (such as the average of the confidence measures over all elements of phrase 456) and place that confidence measure in field 472. It should also be noted that both types of confidence measures (and other confidence measures as well) can be provided in the result returned to application 202.

A variety of other types of information can also be pulled together to provide the rich result to application 202, as indicated by block 480 in FIG. 9. One embodiment of such a result is that indicated by the phrase structure set out below:

| SPPHRASE | |
|---|---|
| Typedef [restricted] struct SPPHRASE | |
| ULONG | cbSize; |
| LANGID | LangID; |
| WORD | wReserved; |
| ULONGLONG | ftStartTime; |
| ULONGLONG | ullAudioStreamPosition; |
| ULONG | ulAudioSizeBytes; |
| ULONG | ulAudioSizeTime; |
| SPPHRASERULE | Rule; |
| const SPPHRASEPROPERTY | *pProperties; |
| const SPHRASEELMENT | *pElements; |
| ULONG | cReplacements; |
| const SPPHRASEREPLACEMENT | pReplacements; |
| GUID | SREngineID; |
| ULONG | ulSREnginePrivateDataSize; |
| const BYE | *pSREnginePrivateData; |
| SPPHRASE | |

Members
  CbSize—The size of this structure in bytes.
  LangID—The language ID of the current language.
  WReserved—Reserved for future use.
  FtStart Time—The start time of the recognition in input stream.
  UllAudioStreamPosition—The start position of the recognition in the input stream.
  UlAudioSizeBytes—The size of audio information.
  UlAudioSizeTime—The time of audio information.
  Rule—The rule that spawned this result.
  pProperties—The pointer to the semantic properties for the rule that spawned this result.
  pElements—The pointer to the elements of the result.
  pReplacements—The pointer to the replacement elements.
  SREngineID—The ID of the SR engine which produced the results.
  UlSREnginePrivateDataSize—The size of any proprietary data sent by the SR engine.
  PSREnginePrivateData—The pointer to the proprietary data.

Thus, it can be seen that the present invention significantly reduces the burden on both SR engine 206 and application 202. CFG engine 212 handles loading, unloading, activation/deactivation and invalidation of grammars. CFG engine 212 also handles adding and deleting words and rules from dynamic grammars and loading multiple grammars. CFG engine 212 also parses results returned by SR engine 206 and generates a rich result which is provided to application 202. It will be appreciated that CFG engine 212 does this all substantially transparently with respect to SR engine 206. The SR engine simply views the information provided by CFG engine 212 as a single grammar which has rules and words that are intermittently added, deleted, activated, deactivated, and invalidated. In this way, SR engine 206 simply needs to recognize speech based on a speech signal input and need not concern itself with all of the various tasks performed by CFG engine 212.

Although the present invention has been described with reference to preferred embodiments, workers skilled in the art will recognize that changes may be made in form and detail without departing from the spirit and scope of the invention.

What is claimed is:

1. A method of managing grammars used in a speech recognition system, comprising:
loading a first grammar in a context-free grammar(CFG) engine;
implementing an engine-independent SR interface between the CFG engine and a speech recognition (SR) engine;
communicating words in the first grammar to the SR engine through the SR interface;
notifying the SR engine, through the SR interface, of rules in the first grammar;
representing the rules in the first grammar to the SR engine through the SR interface;
receiving rule queries from the SR engine through the SR interface;
providing rule information to the SR engine, through the SR interface, the rule information enabling the SR engine to construct an internal representation of the first grammar; and
wherein providing the rule information includes providing a rule identifier, a rule level indicator indicating a level of a corresponding rule, state information representing states in the corresponding rule and transition information representing transitions in the corresponding rule.

2. The method of claim 1 and further comprising:
loading a second grammar in the CFG engine; and
representing the first and second grammars to the SR engine, through the SR interface, as a single grammar.

3. The method of claim 2 wherein representing the first and second grammars to the SR engine comprises:
communicating words in the second grammar to the SR engine through the SR interface;
notifying the SR engine, through the interface, of rules in the second grammar; and
representing the rules in the second grammar to the SR engine through the interface.

4. The method of claim 3 wherein communicating words in the second grammar to the SR engine comprises:
communicating only new words in the second grammar, not in the first grammar, to the SR engine through the SR interface.

5. The method of claim 1 and further comprising:
implementing an application-independent application interface between the CFG engine and an application.

6. The method of claim 5 and further comprising:
receiving an activation input from the application, through the application interface, indicating which of the rules are to be active; and
providing an activation indication from the CFG engine, through the interface, to the SR engine to indicate which of the rules are active, based on the activation input.

7. The method of claim 1 and further comprising:
determining in the CFG engine whether the first grammar refers to any additional grammars; and
if so, loading the additional grammars in the CFG engine.

8. The method of claim 7 and further comprising:
representing the first and additional grammars to the SR engine, through the SR interface, as a single grammar.

9. The method of claim 8 and further comprising:
communicating words in the additional grammars to the SR engine through the SR interface;
notifying the SR engine, through the SR interface, of rules in the additional grammars; and
representing the rules in the additional grammars to the SR engine through the SR interface.

10. The method of claim 1 wherein communicating words in the first grammar to the SR engine through the SR interface comprises:
  providing a word handle to the SR engine identifying each word.

11. A computer readable medium including instructions which, when implemented by a computer, cause the computer to perform a method of managing grammars used in a speech recognition system, comprising:
  loading a first grammar in a context-free grammar(CFG) engine;
  implementing an engine-independent SR interface between the CFG engine and a speech recognition (SR) engine;
  communicating words in the first grammar to the SR engine through the SR interface;
  notifying the SR engine, through the SR interface, of rules in the first grammar; and
  representing the rules in the first grammar to the SR engine through the SR interface;
  receiving rule queries from the SR engine through the SR interface;
  providing rule information to the SR engine, through the SR interface, the rule information enabling the SR engine to construct an internal representation of the first grammar; and
  wherein providing the rule information includes providing a rule identifier, a rule level indicator indicating a level of a corresponding rule, state information representing states in the corresponding rule and transition information representing transitions in the corresponding rule.

* * * * *